(12) United States Patent
Moision et al.

(10) Patent No.: US 10,333,617 B2
(45) Date of Patent: Jun. 25, 2019

(54) FAST ADAPTIVE NESTED MODULATION

(71) Applicant: X Development LLC, Mountain View, CA (US)

(72) Inventors: Bruce Moision, Palo Alto, CA (US); Baris Erkmen, Mountain View, CA (US); Devin Brinkley, Redwood City, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 2 days.

(21) Appl. No.: 15/633,252

(22) Filed: Jun. 26, 2017

(65) Prior Publication Data
US 2018/0183516 A1    Jun. 28, 2018

Related U.S. Application Data

(60) Provisional application No. 62/438,510, filed on Dec. 23, 2016.

(51) Int. Cl.

| | |
|---|---|
| *H04B 10/079* | (2013.01) |
| *H04B 10/112* | (2013.01) |
| *H04B 10/11* | (2013.01) |
| *H04B 10/516* | (2013.01) |
| *H04L 27/36* | (2006.01) |
| *H04L 27/38* | (2006.01) |
| *H04B 10/54* | (2013.01) |

(52) U.S. Cl.
CPC ....... *H04B 10/07955* (2013.01); *H04B 10/11* (2013.01); *H04B 10/5161* (2013.01); *H04B 10/541* (2013.01); *H04L 27/36* (2013.01); *H04L 27/38* (2013.01)

(58) Field of Classification Search
CPC .......... H04B 10/07955; H04B 10/1123; H04B 10/5161
See application file for complete search history.

(56) References Cited

U.S. PATENT DOCUMENTS

| | | |
|---|---|---|
| 7,274,876 B2 | 9/2007 | Gerszberg et al. |
| 2003/0005385 A1 | 1/2003 | Stieger |
| (Continued) | | |

OTHER PUBLICATIONS

International Search Report and Written Opinion dated Mar. 15, 2018, for International Application No. PCT/US2017/064193. 18 pages.

*Primary Examiner* — Nathan M Cors
(74) *Attorney, Agent, or Firm* — Botos Churchill IP Law LLP (57) ABSTRACT

A data rate at which data can be transmitted is adapted in real-time to power fluctuations. Bits of data to be sent by a transmitter are mapped to physical symbols, where a first modulation uses a first number of bits per pulse and a second modulation uses a second number of bits per pulse. Both modulations are sent, with one nested inside the other. A receiver decodes one or both bit streams, depending on a signal to noise ratio (SNR). In this regard, the data rate traces the received power, and higher data rates may be used despite periods of power fluctuations. This technique enables rapid, or even instantaneous, changes by using nested modulation. Moreover, a fast feedback mechanism is used to inform the transmitter when to change its modulation and to retransmit bits lost during an initial transmission.

20 Claims, 6 Drawing Sheets

(56) References Cited

U.S. PATENT DOCUMENTS

| | | |
|---|---|---|
| 2007/0291639 A1 | 12/2007 | Jacobsen et al. |
| 2013/0051346 A1 | 2/2013 | Bergman et al. |
| 2015/0132013 A1 | 5/2015 | Vermeulen |
| 2015/0171961 A1* | 6/2015 | Featherston ..... H04B 10/07955 398/38 |
| 2015/0282185 A1* | 10/2015 | Nikopour .............. H04L 1/0002 370/329 |
| 2016/0094305 A1* | 3/2016 | Yamashita .......... H04J 14/0221 398/34 |
| 2016/0099775 A1 | 4/2016 | Liu et al. |
| 2016/0103382 A1 | 4/2016 | Liboiron-Ladouceur et al. |
| 2016/0226217 A1* | 8/2016 | Jia .......................... H04B 10/07 |
| 2016/0329915 A1* | 11/2016 | Luo ........................ H04B 10/27 |

* cited by examiner

FAST ADAPTIVE NESTED MODULATION

CROSS-REFERENCE TO RELATED APPLICATIONS

The present application claims the benefit of the filing date of U.S. Provisional Patent Application No. 62/438,510 filed Dec. 23, 2016, the disclosure of which is hereby incorporated herein by reference.

BACKGROUND

When sending data, or information, over a channel, a data rate at which the data can be transmitted increases with the received power. In many channels of interest, such as free space optical communication (FSOC) channels, the received power changes with time, for example due to atmospheric scintillation. In the presence of power fluctuations, the data rate is typically set to a level sustainable based on a lowest received power, to prevent loss of transmitted data.

BRIEF SUMMARY

According to the present disclosure, the data rate at which data can be transmitted can adapt in real-time to power fluctuations. Bits of data to be sent by a transmitter are mapped to physical symbols, where a first modulation uses a first number of bits per pulse and a second modulation uses a second number of bits per pulse. Both modulations are sent, with one nested inside the other. A receiver decodes one or both bit streams, depending on a signal to noise ratio (SNR). In this regard, the data rate traces the received power, and higher data rates may be used despite periods of power fluctuations. This technique enables rapid, or even instantaneous, changes by using nested modulation. Moreover, a fast feedback mechanism may be used to inform the transmitter when to change its modulation and to retransmit bits lost when they were first transmitted.

One aspect of the disclosure provides a communication system, including a transmitter, a receiver, and a processor in communication with the transmitter and the receiver. The processor is configured to map data to be transmitted to a first set of symbols and a second set of symbols, wherein the second set of symbols includes the first set of symbols. When the receiver receives one or more signals, a power level associated with one or more transmission channels is determined based on the received one or more signals, and the processor adjusts a transmission rate of the transmitter based on the determined power level, the adjusting including sending either the first set of symbols or the second set of symbols. The one or more transmission channels may include optical transmission channels between the transmitter and a remote optical device. The first set of symbols may be used for transmission when the power level is below a predetermined threshold, and the second set of symbols may be used for transmission when the power level is above the predetermined threshold. According to some examples, the receiver is configured to receive messages from a second communication system regarding a modulation of signals being decoded by the second communication system. The receiver may be configured to relay information to the transmitter regarding a number of bits being received from a second communication system. The transmitter may automatically adjust its transmission rate in response to the information relayed from the receiver. In some embodiments, the transmitter is adapted to transmit the first set of symbols on a first channel and transmit the second set of symbols on a second channel. For example, each symbol includes two or more bits, and a most significant bit is transmitted on the first channel and a least significant bit is transmitted on the second channel.

Another aspect of the disclosure provides a method of fast adaptive communication, including mapping, with one or more processors, data to be transmitted by a transmitter, the mapping including mapping the data to a first set of symbols and a second set of symbols, wherein the second set of symbols includes the first set of symbols. The method further includes receiving, at a receiver in communication with the one or more processors, one or more optical signals, determining, with the one or more processors based on the received one or more signals, a power level associated with one or more transmission channels, and adjusting, with the one or more processors, a transmission rate of the transmitter based on the determined power level, the adjusting including sending either the first set of symbols or the second set of symbols. The method may further include receiving information through a feedback loop between the receiver and the transmitter, the information indicating which bits of a transmitted signal using the second set of symbols were lost, and retransmitting the lost bits using the first set of symbols.

Yet another aspect of the disclosure provides a non-transitory computer-readable medium storing instructions executable by one or more processors for performing a method, including mapping data to be transmitted to a first set of symbols and a second set of symbols, wherein the second set of symbols includes the first set of symbols, receiving one or more signals, determining, based on the received one or more signals, a power level associated with one or more transmission channels, and adjusting a transmission rate of a transmitter based on the determined power level, the adjusting including sending either the first set of symbols or the second set of symbols.

DETAILED DESCRIPTION

Overview

The technology relates to a communication system, such as a free space optical communication (FSOC) system, in which a transmission rate is varied in accordance with fluctuations in power of received signals. Modulation is changed between on-off-keying (OOK) and pulse amplitude modulation 4 (PAM4). To achieve fast switching, both modulations are sent in transmissions by the FSOC system.

For example, the modulation may be nested, such that two OOK points are contained within four PAM4 points. A receiving communication recognizes the modulation of a received signal, and can thus decode the signal.

The FSOC system includes a transmitter and a receiver. According to some examples, the receiver may communicate with the transmitter through an internal feedback loop. In this regard, as the receiver receives signals from a second communication system, the receiver may use those signals to determine information relevant for the transmitting. For example, a power level of the received signals may be detected, and used to determine the transmission rate at which the transmitter will send information.

According to some examples, the transmission rate may be determined without a feedback loop or information from the receiver. For example, the transmitter may be used to determine, based on a power level at which it is transmitting, how many bits are being lost by the second communication system. The transmitter may then adjust its transmission rate based on this inference.

Two or more bits are mapped to symbols being sent by the FSOC system. As opposed to typical systems, where an optical communication signal is either on (wherein a bit "1" is sent) or off (where a bit "0" is sent), according to the present technology four or more symbols may be sent in each transmission using two or more bits. Accordingly, signals may be transmitted at three or more different possible power levels ("01," "11," and "10") in addition to the "off" symbol ("00"). In this regard, two OOK points (00 and 10) are contained within four PAM 4 points (00, 01, 11, 10).

The receiver of the second communication system may always attempt to decode PAM4 modulation, upon receipt of the signals. If the receiver detects that it is making errors on bits of the received signals, the receiver may notify the first FSOC system, which adapts in real-time. For example, if there is a low signal-to-noise (SNR) ratio, the receiver of the second communication system may be receiving less than all of the transmitted bits. For example, the receiver may only be detecting the most significant bit. The receiver may relay such information back to the transmitter of the first FSOC. Upon receiving such information, the first FSOC may automatically adjust (e.g., reduce) its transmission rate. Moreover, any lost bits may be retransmitted.

Example Systems

Figure 1:
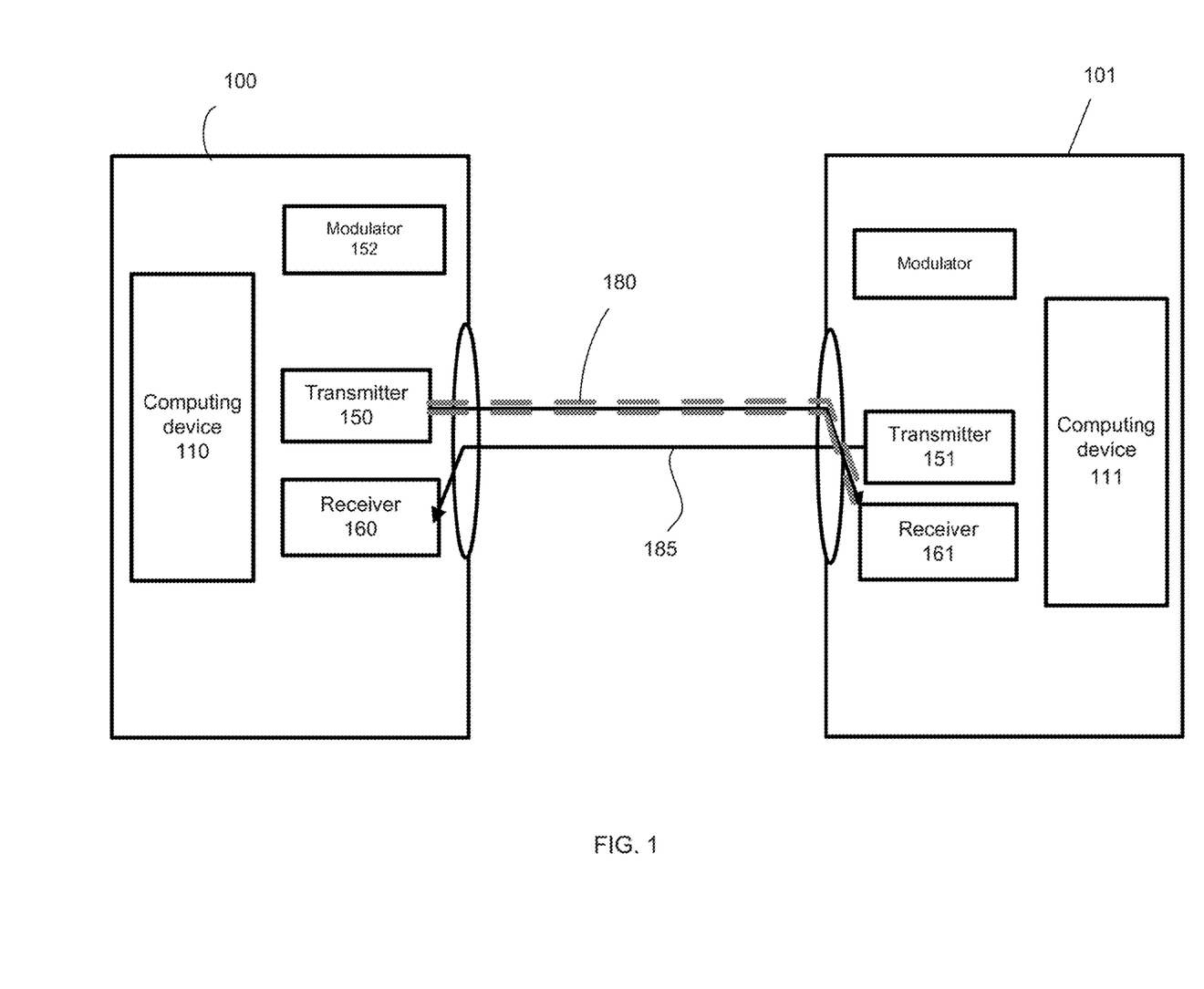
FIG. 1 is a block diagram illustrating communication between two FSOC systems according to aspects of the disclosure.

FIG. 1 provides an example of communication between a first FSOC systems 100 and a second FSOC system 101. The systems 100, 101 are shown as having the same structure, including a transmitter 150, receiver 160, modulator 152, and computing device 110. However, it should be understood that the structure of either or both FSOC systems 100,101 may differ. Moreover, while some example components are shown, it should be understood that a variety of other components may be present.

Modulator 152 may be used to modulate data to be sent by the first FSOC system 100. The modulator 152 may be adapted to use any of a variety of modulation schemes, including pulse amplitude modulation, pulse position modulation, on-off keying (OOK), etc. According to one example, the modulator 152 modulates the data to be sent using both PAM4 and OOK. For example, the modulator 152 maps the data to be sent to a plurality of symbols. For example, for each pulse, four symbol values send two bits of data. In that regard, the symbol values may be 00, 01, 10, 11. In other examples, a different number of symbol values may be used, such as eight symbol values. If more symbol values are used, more bits per pulse may also be sent. While one modulator 152 is shown in the first FSOC system 100, it should be understood that a plurality of modulators 152 may be present. For example, separate modulators may be used for PAM4 and for OOK.

The transmitter 150 is adapted to send data using nested modulation signals 180. For example, the signals 180 may include a first bitstream modulated using OOK and a second bitstream, nested within the first bitstream, using PAM4 modulation. The signals 180 are received at receiver 161 of FSOC system 101.

The receiver 161 may always try to decode PAM 4. At times when a power level of a channel over which the signal 180 is received is low, the receiver 161 may make errors on bits. Computing device 111 may determine, for example, that a bit-error rate of the signal 180 received at the receiver 161 is above a predetermined threshold. According to some examples, transmitter 151 may report information regarding the bit-error rate back to the first FSOC system 100.

The FSOC system 101 may send a second signal 185 to the first FSOC system 100 through transmitter 151. The second signal 185 may include information regarding the bit-error rate of the signal 180 received at the receiver 161. In other examples, the second signal 185 may include any other data to be sent to the first FSOC system 100. The second signal 185, similar to the signal 180, may be a PAM4 modulated bitstream nested within an OOK modulated bitstream. The second signal 185 is received at the receiver 160 of the first FSOC 100.

In some examples, the second signal is used to determine a bit rate for further signals to be transmitted from the first FSOC system 100 to the second FSOC system 101. For example, a feedback loop may exist between the receiver 160 and the transmitter 150. The feedback loop may include computing device 110. The computing device 110 may determine a power level of the received signal. The power level may be measured, for example, by a signal to noise ratio (SNR) of a channel over which the second signal 185 was received, a bit-error rate of the second signal 185, etc. Based on the determined power level, the computing device 110 may cause a bit rate at which further signals are transmitted by the transmitter 150 to change. For example, if the SNR is determined to be below a predetermined threshold, the transmitter 150 may switch to sending further signals using only OOK modulation. For example, the transmitter 150 may continue to receive two bitstreams from the modulator 152, but selects to send only one. As additional signals are continually received at the receiver 160, information is provided through the feedback loop to the transmitter. In that regard, as soon as the power level of the channel increases above a threshold, the transmitter 150 may send subsequent information using nested PAM4 in OOK signals. In one implementation, computing device 110 infers that bits are being lost at receiver 161 by monitoring the SNR at receiver 160 and using prior knowledge that the SNRs at receiver 160 and receiver 161 are correlated.

Figure 2A:
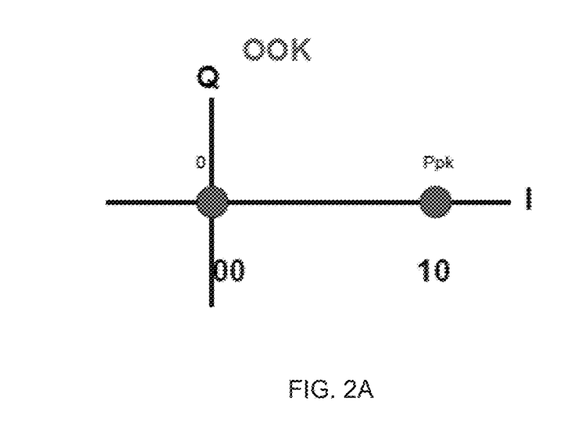
FIGS. 2A-2B illustrate examples of mapping bits of data to symbols according to aspects of the disclosure.
Figure 2B:
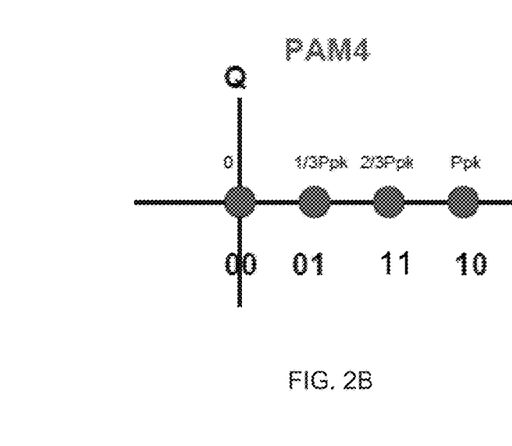

FIGS. 2A-2B illustrate examples of mapping bits of data to symbols according to aspects of the disclosure. FIG. 2A is a constellation diagram, providing an example of the mapping using OOK. The constellation diagram shows the modulation in terms of amplitude and phase. In this example the x-axis represents in-phase and the y-axis represents quadrature. As shown, two symbol values are provided: 00 and 10. The symbol value 10 corresponds to peak power (Ppk). According to one example, two independent data channels are used—one for a most significant bit (MSB) and one for a least significant bit (LSB). At times when a power level is low, only the MSB data channel may be used.

FIG. 2B provides an example of the mapping using PAM4. As shown, four symbols are provided: 00, 01, 11, 10. Two of these symbols (00, 10) correspond to the symbols used in the OOK mapping. The additional symbols (01, 11) are nested within the OOK symbols, and represent ⅓Ppk and ⅔Ppk, respectively. At times when the power level is high, the MSB and the LSB are used.

Figure 3A:
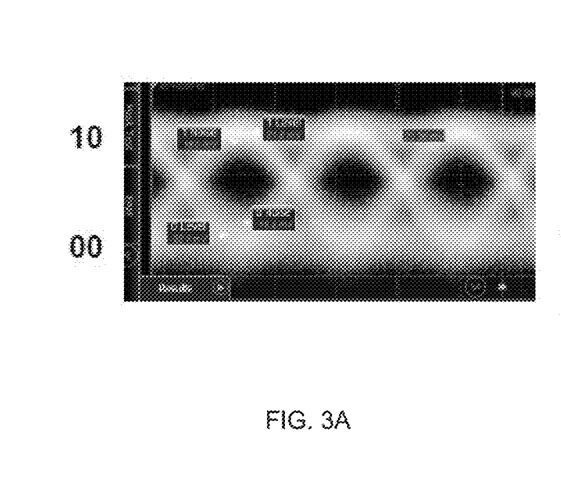
FIGS. 3A-3B illustrate examples of bitstreams corresponding to the mapped data according to aspects of the disclosure.
Figure 3B:
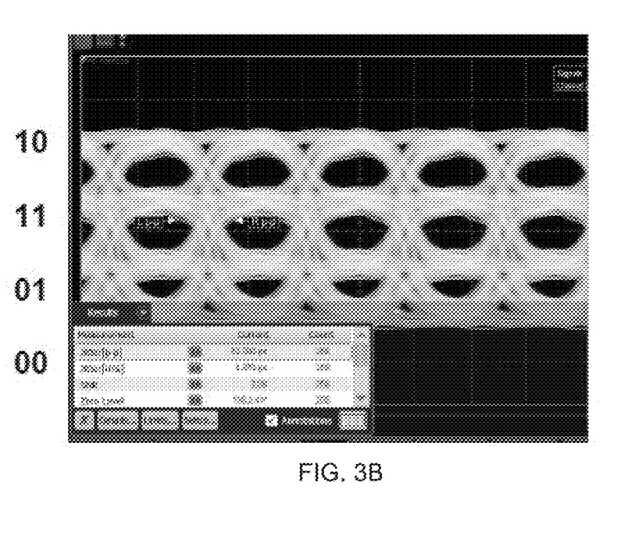

FIGS. 3A-3B illustrate examples of bitstreams corresponding to the mapped data. FIG. 3A corresponds to the OOK mapping of FIG. 2A, and FIG. 3B corresponds to the PAM4 mapping of FIG. 2B. In FIG. 3A, only outside levels are sent, while in FIG. 3B additional levels are nested within the outside levels.

Figure 4:
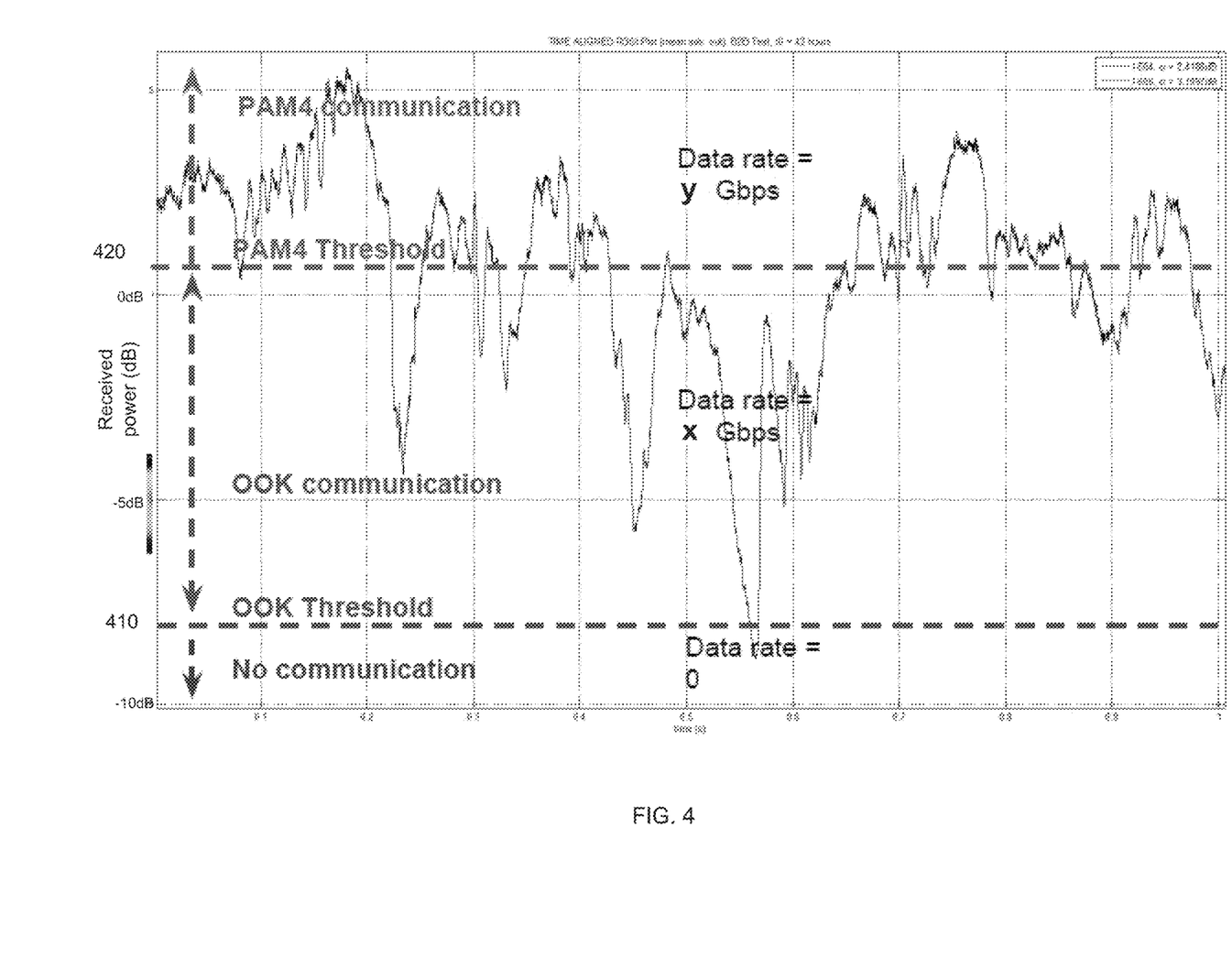
FIG. 4 is an example plot illustrating variations in data rate of transmitted data over time, according to aspects of the disclosure.

FIG. 4 is an example plot illustrating variations in data rate of transmitted data over time. A vertical axis of the plot represents a power level of one or more available optical channels, shown as ranging between −10 dB and above 5 dB. As mentioned above, the power level may be measured based on received signals. A horizontal axis of the plot represents time, shown as ranging from 0 s to 1 s. It should be understood that the ranges of power level and time provided are merely examples, and that the power level may vary outside of such ranges over extended time periods.

OOK threshold 410 represents a power level of the channels above which OOK signals may be sent by a first FSOC system and accurately received by a second FSOC system. Below the OOK threshold 410, no communications are sent. As such, the data rate of transmitted data below the OOK threshold 410 is zero. The OOK threshold may be, for example, approximately 5-10 dB, or any other value.

PAM4 threshold 420 represents a power level of the channels above which PAM4 communications may be sent by the first FSOC system and accurately received by the second FSOC system. In some examples, the PAM4 threshold may be approximately 1 dB, although in other examples different values may be used for the PAM4 threshold. Between the PAM4 threshold 420 and the OOK threshold 410, OOK communications are sent.

As time passes, over the course of 1 s, the power level for the channels varies between −10 dB and above 5 dB. The transmitting FSOC system in turn adapts the data rate at which data is sent. Between 0.1 s and 0.2 s, the data rate fluctuates within the PAM4 range. Between 0.2 s and 0.5 s, the data rate fluctuates between the PAM4 range and the OOK range. Between 0.5 s and 0.6 s the data rate fluctuates between the OOK range and the no communications range. Between 0.6 s and 1 s, the data rate fluctuates between the OOK range and the PAM4 range.

Figure 5:
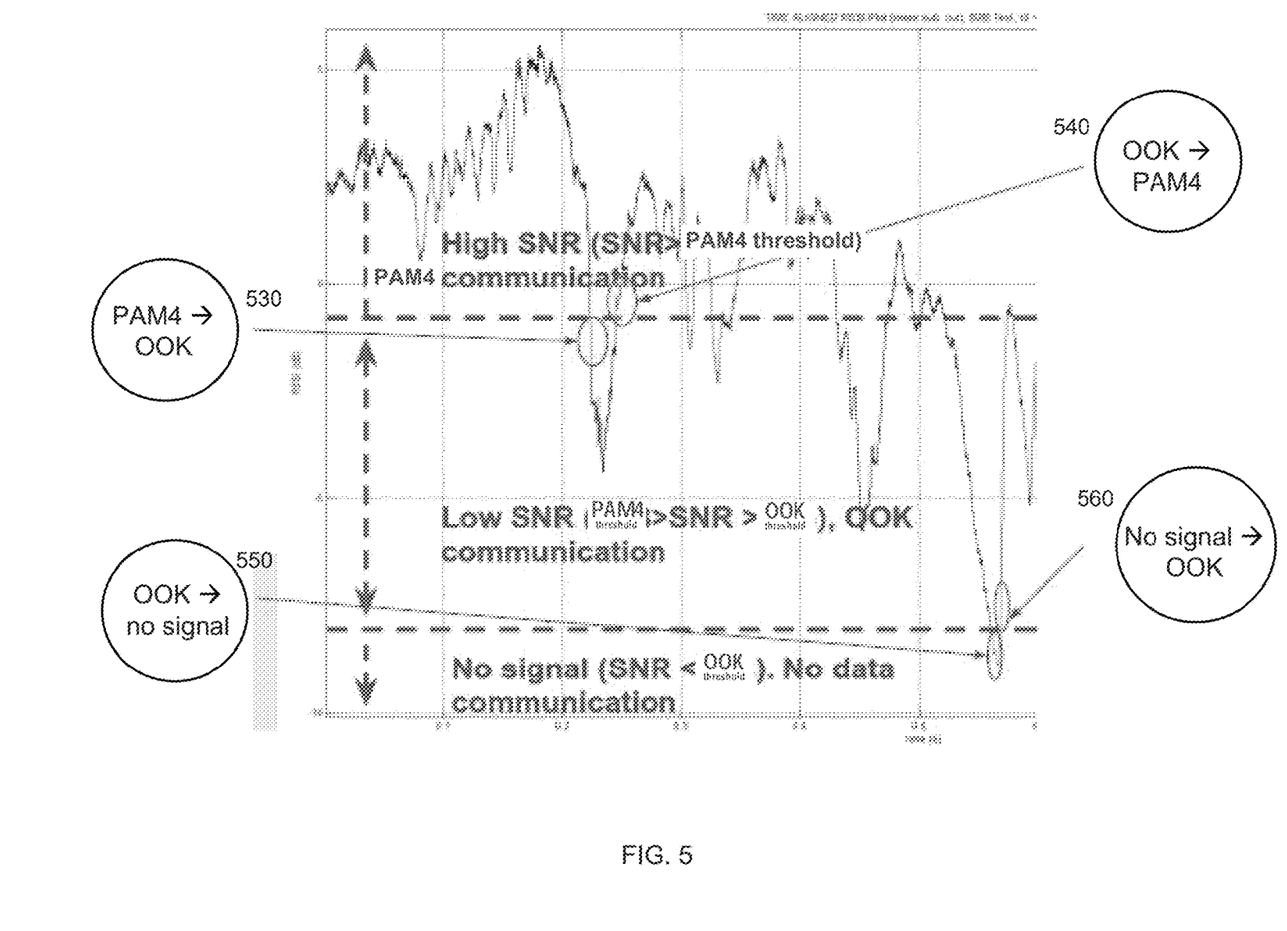
FIG. 5 illustrates the plot of FIG. 4, highlighting example transitions in data rate according to aspects of the disclosure.

FIG. 5 illustrates a portion of the plot of FIG. 4, highlighting example transitions in the power level of the channels and therefore the data rate of the transmitted data. In this example, two channels may be used, with a first channel mapped to the MSB and a second channel mapped to the LSB, described above in connection with FIGS. 2A-2B and 3A-3B. Each channel may have a bandwidth of, for example, approximately 10 Gbps. It should be understood that in other examples, particularly examples using different types of communications or different modulations, channels of different bandwidths, such as 15 Gbps, 100 Mbps, 100 Gbps, may be used.

At transition point 530, the power level of the first and second channels drops below the PAM4 threshold. For example, the SNR of the received signal at the first FSOC system drops below approximately 8 dB. At this point, the second FSOC system receiving the signals will be able to decode the MSB, but not the LSB. Accordingly, the first FSOC system transitions from PAM4 to OOK, stops transmitting the LSB, and only transmits the MSB. The first FSOC system may also determine, via a feedback path, which LSB bits were lost and retransmit those, using only the MSB. Thus, for example, the change in data rate by the transmitting first FSOC is responsive to the detected power level of the available channels. The PAM4 threshold shown in FIG. 5 is merely an example, and it should be understood that any of a broad range of values may be used.

At transition point 540, the power level increases and therefore the transmitted data transitions from OOK to PAM4. Accordingly, the first FSOC system may begin transmitting the LSB again.

At transition point 550, the power level becomes very low. For example, the SNR may be less than the OOK threshold. Alternatively or additionally, the bit error rate may be very high. In some examples, the first FSOC system may stop transmitting, as too many bits will be lost by the second FSOC system trying to receive the data. In other examples, the first FSOC continues transmitting, allowing the second FSOC system to continuously try recovering the data and to quickly determine when data is received correctly. In yet another example, the first FSOC system sends data only sporadically during this low power interval in order to save transmit power. It may return to transmitting at full rate when it receives a signal from the second FSOC system that the data is being received correctly.

At transition point 560, the power level rises back up above the OOK threshold. Accordingly, the first FSOC system transitions from transmitting no signals to transmitting the MSB. The second FSOC system receiving the MSB may need to re-acquire a lock to the data. For example, the second FSOC system re-acquires phase and frequency lock of the receiver clock to the data.

By adapting the data rate to the fluctuations in available power level, throughput is increased. For example, rather than continuously sending at a fixed data rate, the FSOC system can take advantage of periodic increases in power, even if such increases only last a tenth or hundredth of a second.

Figure 6:
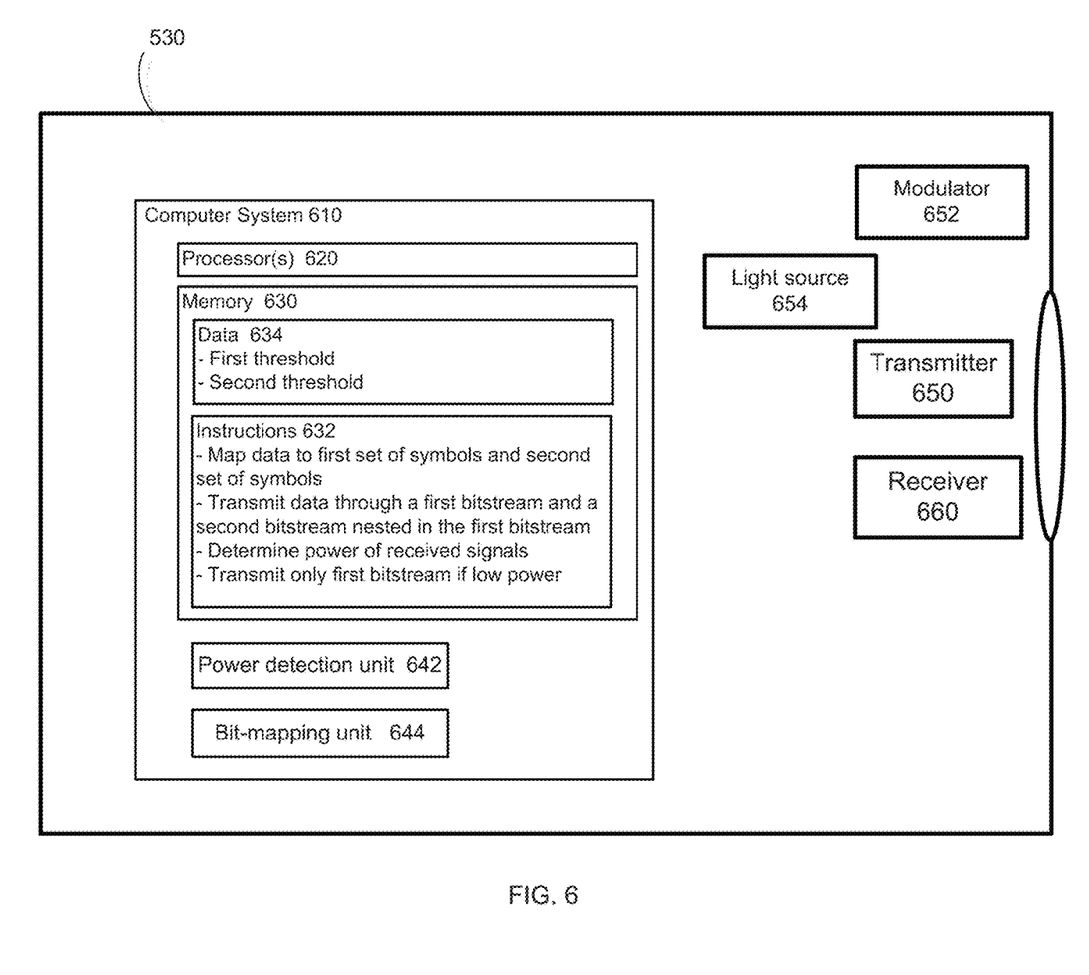
FIG. 6 is a block diagram of an example system for fast adaptive modulation according to aspects of the disclosure.

FIG. 6 is a block diagram illustrating an example system 600, such as an FSOC system. The system 600 includes various components, including one or more computers, such as computer 610 containing one or more processors 620, memory 630, and other components typically present in general purpose computers. The one or more computers 610 may further include, for example, a power detection unit 642 and a bit-mapping unit 644. The one or more computers 310 may be in communication with other components of a FSOC system, such as transmitter 650, receiver 660, modulator 652, light source 654, and other components that are not shown, such as fibers, amplifiers, circuitry, wiring, etc.

The memory 630 stores information accessible by processor 620, including instructions 632 and data 634 that may be executed or otherwise used by the processor 620. The memory 630 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 632 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 634 may be retrieved, stored or modified by processor 620 in accordance with the instructions 632. For instance, although the system and method is not limited by any particular data structure, the data may be stored in computer registers, in a relational database as a table having a plurality of different fields and records, XML documents or flat files. The data may also be formatted in any computer-readable format. The data may comprise any information, such as numbers, descriptive text, proprietary codes, references to data stored in other areas of the same memory or different memories (including other network locations) or information that is used by a function to calculate the relevant data.

The processor 620 may be any conventional processor, such as processors from Intel Corporation or Advanced Micro Devices. Alternatively, the processor may be a dedicated device such as an ASIC. Although FIG. 6 functionally illustrates the processor, memory, and other elements of computer 610 as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor or computer will be understood to include references to a collection of processors or computers or memories that may or may not operate in parallel.

Computer 610 may include all of the components normally used in connection with a computer such as a central processing unit (CPU), graphics processing unit (GPU), memory (e.g., RAM and internal hard drives) storing data 634 and instructions such as a web browser, an electronic display (e.g., a monitor having a screen, a small LCD touch-screen or any other electrical device that is operable to display information), and user input (e.g., a keyboard, touch-screen and/or microphone). While the computer system 610 is shown as being within the FSOC system 600, it should be understood that the computer system 610 may be external to the FSOC system 600 but still communicatively coupled to the components within.

Computer 610 may also include a bit-mapping unit 644. The bit-mapping unit may be used to map data to be transmitted to symbols. For example, the data may be mapped according to two different modulations. In one example, the first modulation is OOK and the second modulation is PAM, although it should be understood that other modulations are possible. As such, the OOK symbols may include 00 and 10, while the PAM4 symbols include 00, 01, 11, 10. Keeping with this example, two symbols/pulse may be send using OOK modulation and four symbols/pulse may be sent with PAM4 modulation.

Computer 610 may also include power detection unit 642, which determines a power level of one or more available communication channels between the FSOC system and other communication systems. According to one example, the power detection unit receives information from signals received at receiver 660. Such information may include signal strength, bit error rate, SNR, or any of a variety of other information. For example, the signals received at the receiver 660 may include feedback from another FSOC system, based on signals previously sent by the transmitter 650 to the other FSOC system. This information may indicate which bits were received at the other FSOC system, such as whether the LSB is received or only the MSB. As another example, the power level may be inferred by other information received at the receiver 660, although such information may not include specific feedback on information sent by the transmitter 650.

The transmitter 650 and the receiver 660 may include any commercially available components, or they may have specialized hardware. For example, the specialized hardware may be adapted to increase a rate at which feedback is provided from the receiver 660 to the transmitter 650. As another example, the specialized hardware may be adapted to enhance communication with the modulator 652. While the transmitter 650 and receiver 660 are shown as separate entities, it should be understood that they may be a single transceiver unit. Moreover, while the computer system 610 is shown as being separate from by communicatively coupled with the transmitter 650 and receiver 660, it should be understood that the computer system 610 may be incorporated within either or both of the transmitter 650 and receiver 660.

The modulator 652 may be a single modulator or may be multiple modulators working in parallel. For example, the modulator 652 may encode the data to be transmitted using both OOK and PAM4, or a separate modulator may be used for each type of encoding. The modulator 652 may always encode using both OOK and PAM4 and possibly other types of modulation, or in other examples the modulator 652 may selectively perform the encoding based on the available power levels. For example, if the available power level is below the PAM4 threshold, the modulator 652 may only encode data using OOK modulation.

The light source 654 may be a laser or any other type of light source. Moreover, while the foregoing examples relate primarily to optical communications, it should be understood that such techniques may be adapted to other types of communication as well.

Example Methods

Figure 7:
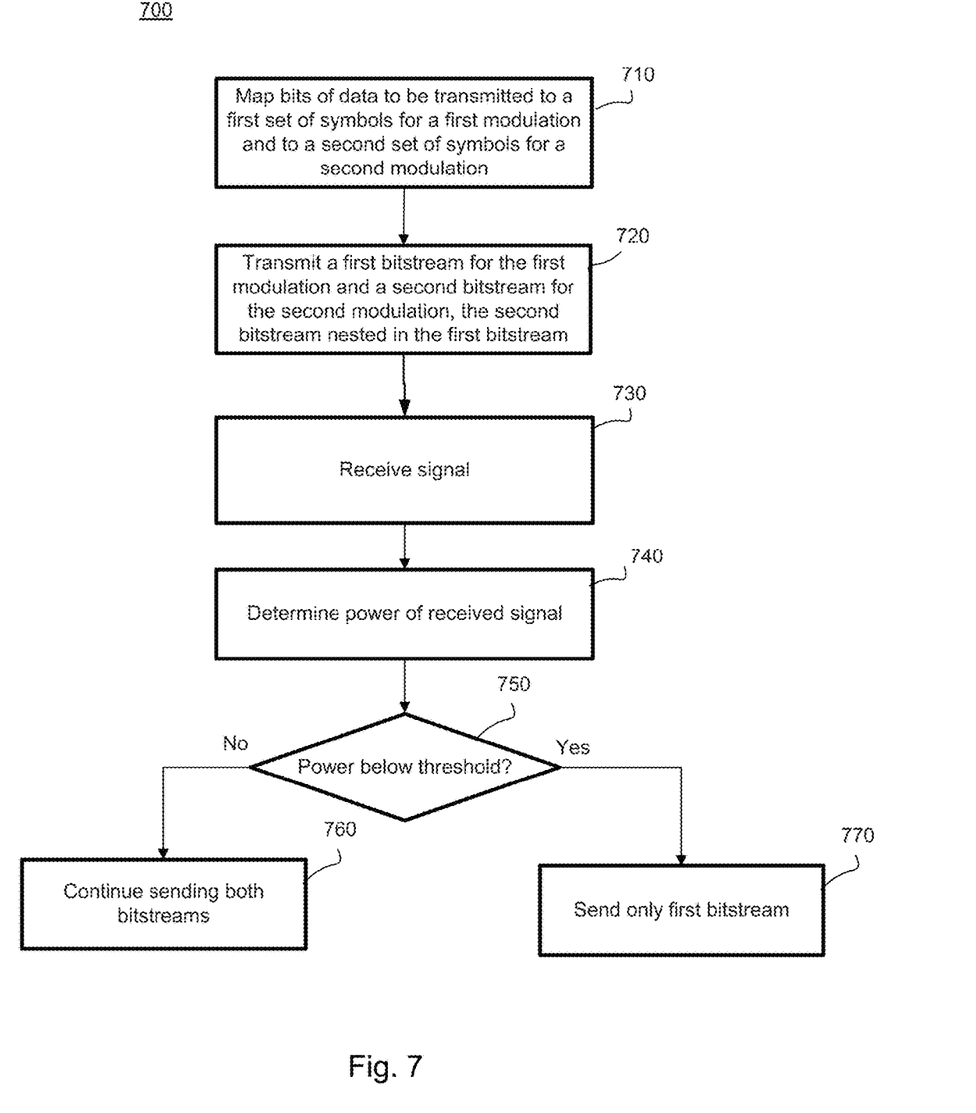
FIG. 7 is a flow diagram illustrating a method of transmitting signals with fast adaptive modulation according to aspects of the disclosure.

FIG. 7 illustrates a method 700 of transmitting signals with fast adaptive modulation. The method 700 maybe performed by, for example, a FSOC system. While the operations associated with the method 700 are described in a particular order, it should be understood that they may be performed in a different order or simultaneously. Moreover, operations may be added or omitted.

In block 710, bits of data are mapped to a first set of symbols for a first modulation and a second set of symbols for a second modulation. For example, referring back to FIGS. 2A-2B, the data may be mapped to the symbols 00, 10 for OOK modulation, and at the same time the data may be mapped to the symbols 00, 01, 11, 10 for PAM4 modulation. While these examples use two bits to represent each symbol, it should be understood that additional bits may be used, and additional symbols may be used. Moreover, other types of modulation may be used.

In block 720, a first bitstream of data is transmitted for a first bit of each symbol (MSB), while a second bitstream is transmitted for the second bit of each symbol (LSB). The second bitstream may be nested within the first bitstream. According to one example, the most significant bit for each symbol is sent on a first channel while the least significant bit for each symbol is sent on a second channel. In examples where additional bits are used to represent each symbol, third or further channels may be used for the additional bits.

In block 730, a signal is received by the FSOC system. The signal may include feedback related to the transmitted bitstreams, or it may include any other type of information not related to the bitstreams.

In block 740, a power level of available communication channels is determined based on the received signal. For example, a received signal strength is measured. In other examples, a signal-to-noise ratio or bit error rate is measured.

In block 750, it is determined whether the measured power level is below a predetermined threshold, such as the PAM4 threshold. For example, the threshold may be set to a value between approximately 7-9 dB. If the power level is above the threshold, the FSOC system continues sending both bitstreams in block 760. For example, both the MSB and the LSB of each symbol are transmitted. However, if it is determined that the power level is below the threshold, then only the first bitstream is transmitted in block 770. For example, the LSB is dropped.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A communication system, comprising:
    a transmitter;
    a receiver;
    a processor in communication with the transmitter and the receiver, the processor configured to:
        map data to be transmitted to a first modulation using a first set of symbols and a second modulation using a second set of symbols, wherein the first modulation is nested within the second modulation;
        receive one or more signals;
        determine, based on the received one or more signals, a power level associated with one or more transmission channels; and
        adjust a transmission rate of the transmitter based on the determined power level, the adjusting including sending either the first set of symbols or the second set of symbols.

2. The communication system of claim 1, further comprising a feedback loop between the receiver and the transmitter.

3. The communication system of claim 2, wherein the receiver is configured to receive messages from a second communication system regarding a modulation of signals being decoded by the second communication system.

4. The communication system of claim 2, wherein the receiver is configured to relay information to the transmitter regarding a number of bits being received from a second communication system.

5. The communication system of claim 2, wherein the transmitter is configured to automatically adjust its transmission rate in response to the information relayed from the receiver.

6. The communication system of claim 1, wherein the transmitter is adapted to transmit the first set of symbols on a first channel and transmit the second set of symbols on a second channel.

7. The communication system of claim 1, wherein each symbol of the first and second sets of symbols comprises two or more bits, and a most significant bit of the two or more bits is transmitted on a first channel and a least significant bit of the two or more bits is transmitted on a second channel.

8. The communication system of claim 1, wherein the first set of symbols are on-off-keying (OOK) modulation symbols.

9. The communication system of claim 1, wherein the second set of symbols are pulse amplitude modulation 4 (PAM4) symbols.

10. The communication system of claim 1, wherein the one or more transmission channels include optical transmission channels between the transmitter and a remote optical device.

11. The communication system of claim 1, wherein the first set of symbols are used for transmission when the power level is below a predetermined threshold, and the second set of symbols are used for transmission when the power level is above the predetermined threshold.

12. The communication system of claim 11, wherein the one or more processors are configured to continuously measure the power level of the received signals, and adjust the transmission rate of the transmitter in response.

13. A method of fast adaptive communication, comprising:
    mapping, with one or more processors, data to be transmitted by a transmitter, the mapping including mapping the data to a first modulation using a first set of symbols and a second modulation using a second set of symbols, wherein the first modulation is nested within the second modulation;
    receiving, at a receiver in communication with the one or more processors, one or more optical signals;
    determining, with the one or more processors based on the received one or more signals, a power level associated with one or more transmission channels; and
    adjusting, with the one or more processors, a transmission rate of the transmitter based on the determined power level, the adjusting including sending either the first set of symbols or the second set of symbols.

14. The method of claim 13, further comprising:
    receiving information through a feedback loop between the receiver and the transmitter, the information indicating which bits of a transmitted signal using the second set of symbols were lost; and
    retransmitting the lost bits using the first set of symbols.

15. The method of claim 13, further comprising receiving messages from a second communication system regarding a modulation of signals being decoded by the second communication system.

16. The method of claim 15, further comprising relaying information to the transmitter regarding a number of bits being received from the second communication system.

17. The method of claim 13, further comprising transmitting the first set of symbols on a first channel and transmitting the second set of symbols on a second channel.

18. The method of claim 13, wherein each symbol of the first and second sets of symbols comprises two or more bits, and a most significant bit of the two or more bits is transmitted on a first channel and a least significant bit of the two or more bits is transmitted on a second channel.

19. The method of claim 18, wherein the one or more transmission channels include optical transmission channels between the transmitter and a remote optical device.

20. A non-transitory computer-readable medium storing instructions executable by one or more processors for performing a method, comprising:
- mapping data to be transmitted to a first modulation using a first set of symbols and a second modulation using a second set of symbols, wherein the first modulation is nested within the second modulation;
- receiving one or more signals;
- determining, based on the received one or more signals, a power level associated with one or more transmission channels; and
- adjusting a transmission rate of a transmitter based on the determined power level, the adjusting including sending either the first set of symbols or the second set of symbols.

* * * * *